Nov. 27, 1956   H. C. HAMONTRE ET AL   2,771,686
INSTRUMENT TO MEASURE THE DIAMETER OF SUBSURFACE WELL BORES
Filed Aug. 21, 1953   8 Sheets-Sheet 1

INVENTORS
FREDERICK E. ARMSTRONG
HUGH C. HAMONTRE and
FRITZ G. MUELLER
BY H. L. Boolfre
ATTORNEY Nov. 27, 1956  H. C. HAMONTRE ET AL  2,771,686
INSTRUMENT TO MEASURE THE DIAMETER OF SUBSURFACE WELL BORES
Filed Aug. 21, 1953  8 Sheets-Sheet 2

INVENTORS
FREDERICK E. ARMSTRONG
HUGH C. HAMONTRE
FRITZ G. MUELLER
BY
ATTORNEY

Nov. 27, 1956

H. C. HAMONTRE ET AL

2,771,686

INSTRUMENT TO MEASURE THE DIAMETER OF SUBSURFACE WELL BORES

Filed Aug. 21, 1953

INVENTORS
FREDERICK E. ARMSTRONG
HUGH C. HAMONTRE and
FRITZ G. MUELLER

BY *H. J. Soelhern*
ATTORNEY

Nov. 27, 1956 H. C. HAMONTRE ET AL 2,771,686
INSTRUMENT TO MEASURE THE DIAMETER OF SUBSURFACE WELL BORES
Filed Aug. 21, 1953 8 Sheets-Sheet 4

INVENTORS
FREDERICK E. ARMSTRONG
HUGH C. HAMONTRE
FRITZ G. MUELLER
BY H. L. Godfrey
ATTORNEY Nov. 27, 1956  H. C. HAMONTRE ET AL  2,771,686
INSTRUMENT TO MEASURE THE DIAMETER OF SUBSURFACE WELL BORES
Filed Aug. 21, 1953  8 Sheets-Sheet 7

Fig. 20.

INVENTORS
FREDERICK L. ARMSTRONG
HUGH C. HAMONTRE and
FRITZ G. MUELLER
BY
ATTORNEY United States Patent Office 2,771,686
Patented Nov. 27, 1956

2,771,686

INSTRUMENT TO MEASURE THE DIAMETER OF SUBSURFACE WELL BORES

Hugh C. Hamontre, Fritz G. Mueller, and Frederick E. Armstrong, Bartlesville, Okla.

Application August 21, 1953, Serial No. 375,843

16 Claims. (Cl. 33—178)

(Granted under Title 35, U. S. Code (1952), sec. 266)

The invention described herein may be manufactured and used by or for the Government of the United States for governmental purposes without the payment to us of any royalty thereon in accordance with the provisions of the Act of April 30, 1928 (ch. 460, 45 Stat. L. 467), 35 U. S. C. 266.

This invention relates to electrical calipers for well bores, and more particularly, to a novel caliper probe and to a novel combination of electrical control and measuring means with the caliper probe whereby the diameter of a well bore may be quickly and accurately determined and recorded.

Petroleum engineering often requires an accurate knowledge of the diameter of a well bore to solve the problems of petroleum production. This is particularly important in the development of methods for secondary recovery of oil. It is necessary to know the diameter of a well bore to make calculations to determine the treatment to be given the well, and to determine the results obtained after the treatment has been completed. Frequently, the necessity for treating a well does not become apparent until after the well is completed and has been in operation for some time. For example, water-flood operators complete many of the water-input wells with a string of 2-inch tubing cemented at the top of the producing zone. After a well has been completed in this way, it is an expensive operation to remove the 2-inch tubing from the well should it become necessary to obtain a caliper log of the diameter of the bore hole in the producing zone.

An object of this invention is to provide improved apparatus for the calipering of well bores.

Another object of the invention is to provide an improved caliper probe which can be lowered into a well through a small diameter tubing.

A further object of this invention is to provide a combination of a well caliper probe with an electrical system in which improved control, measuring, and calipering means cooperate to provide a convenient and accurate appparatus for automatically logging or recording variations in the diameter of a well bore.

Another object of the invention is to provide an improved caliper probe which can be lowered into an oil well and which is provided with means for selectively opening and closing the measuring arms while the device is in the well bore.

Another object of the invention is to provide an electrical system for selectively actuating mechanism for opening and closing the measuring arms of the caliper probe in response to electrical signals originating at the surface of the ground.

Another object of the invention is to provide a novel electrical system for selectively measuring and recording the position of the measuring arms of the oil well caliper.

Another object of this invention is to provide an improved caliper probe in which means are provided to permit independent motion of the measuring arms in response to hydraulic pressure.

Another object of this invention is to provide electrical control means in combination with a caliper probe whereby a circuit for operating means for extending and retracting the caliper arms, a circuit for selectively connecting measuring resistors, and a circuit for measuring the resistance of the measuring resistors may be selectively operated through a single conductor from the caliper probe to the ground equipment.

Another object of the invention is to provide means in the measuring circuit of electrical caliper apparatus whereby a linear reading of the radii of the well bore may be directly indicated on the meter scale.

These and other objects and advantages of the invention will be more fully understood from the following description taken in connection with accompanying drawings in which.

The well calipering apparatus of this invention broadly comprises an electrical recording and control system located at the surface of the ground, and connected by means of a single conductor to a caliper probe having a plurality of caliper arms and containing electrical means for extending or retracting the arms and for selectively measuring their position in response to signals from the surface system.

In a more specific embodiment of the invention, the well bore calipering apparatus comprises a combination of surface equipment including a measuring circuit, a control circuit, and means for selectively supplying electrical power at different voltages to the control circuit, with an elongated caliper probe having four measuring arms adapted to be lowered into a well and connected to the surface apparatus by a single conductor cable, switch means in said surface equipment for selectively connecting the control circuit and the measuring circuit to the single conductor, a reversible motor in the caliper probe, hydraulic means responsive to the direction of rotation of the reversible motor to selectively extend and retract the measuring arms, switch means in the probe operable to reverse the direction of rotation of the reversible motor at predetermined limits of travel of the hydraulic means, a separate measuring resistor in the probe for each of the measuring arms the resistance thereof being determined by the position of the respective measuring arm, stepping relay means in the probe for selectively connecting each of the measuring resistances in sequence to the measuring circuit, and means in the probe responsive to a selected control voltage to complete a circuit to the reversible motor and responsive to a different selected voltage to operate the stepping relay means.

It will be understood that the invention resides both in the novel combination of elements as described above and in the many individual features of the caliper probe and electrical circuits.

Figures 1, 2, 10:
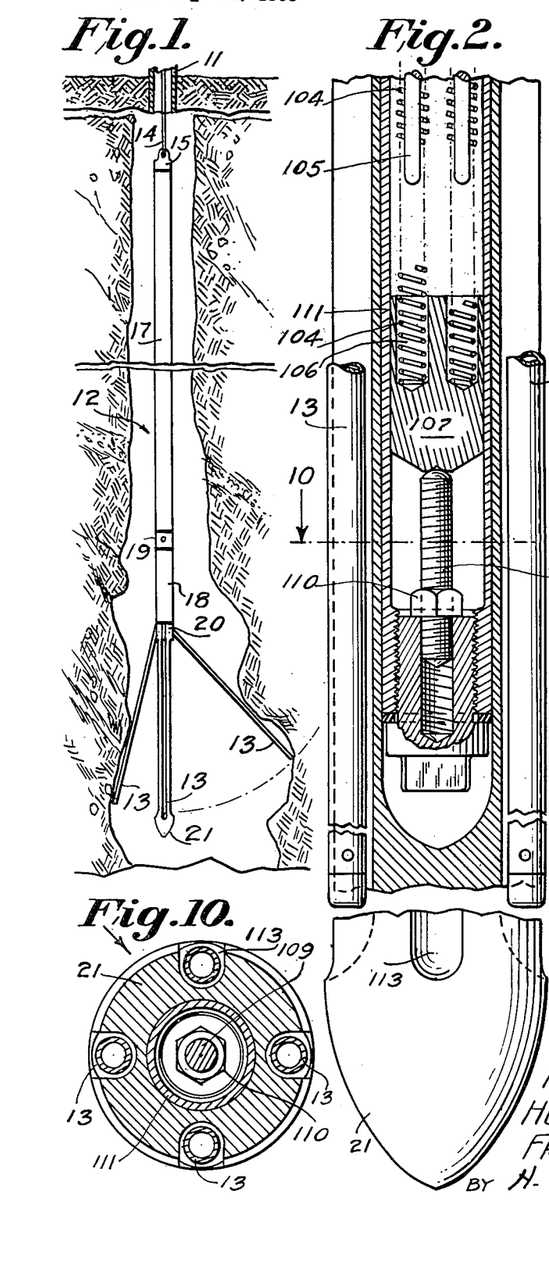
Fig. 1 is a cross-sectional view of a well bore hole showing a well bore caliper embodying the invention in operative position therein.
Fig. 2 is an enlarged cross-sectional view of the lowermost portion of the well bore caliper shown in Fig. 1.
Fig. 10 is a cross-section through the caliper probe taken on the line 10—10 of Fig. 2 and showing the manner in which the caliper arms are recessed into the caliper body.
Figure 3:
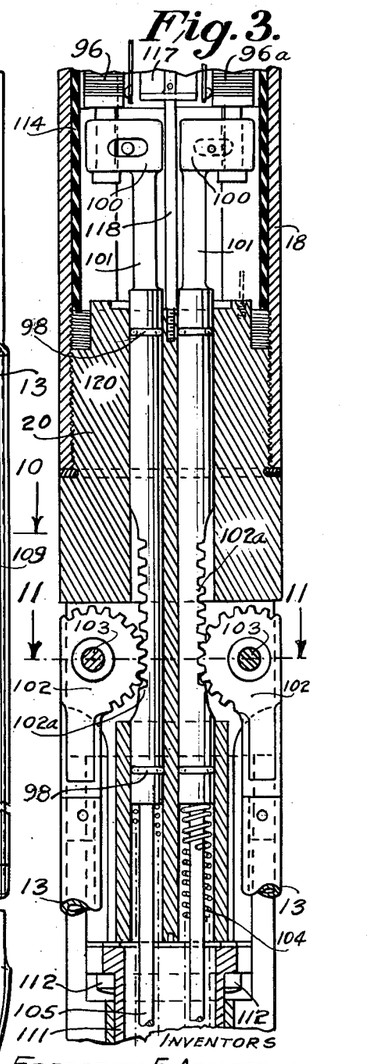
Fig. 3 is an enlarged cross-sectional view of an intermediate portion of the well bore caliper of Fig. 1 and is a continuation of Fig. 2.

Referring now to the drawings in detail for an illustration of one apparatus embodying the principles of the invention, there is shown in Fig. 1 a cross-section of a portion of a well bore, having a tubing 11 of narrow diameter encased in a top section thereof. A caliper probe 12, embodying the principles of this invention, having extended measuring arms 13, is shown in measuring position in the well bore, the caliper probe with the arms in retracted position having been lowered through the tubing 11 by means of conductor cable 14 which carries a single conductor. This conductor cable may be of a type commonly used in the oil fields for electrical logging, and may be provided with a steel sheath which makes a good ground connection.

The essential parts of the caliper probe are shown in Figs. 2 through 9 which together form a complete assembly thereof. The instrument is fastened to conductor cable head 15 (Fig. 9) in any convenient manner as by a screw-thread connection 16 in housing tube 17. The electrical equipment contained in the caliper probe is incased in housing tube 17 and in a further housing tube 18 coupled thereto by a coupling member 19. The housing tube 18 is in turn coupled to plunger block 20 which carries the measuring arms 13. Bottom piece 21 completes the exterior assembly of the device. It will be understood that suitable gaskets are provided at each connection so as to seal well fluids out of the instrument. The two housing tubes and all other exterior parts may be made of such cross-sectional dimensions as to clear a 2-inch opening and are preferably made of a corrosion resistant material, as for example, stainless steel.

Figure 9:
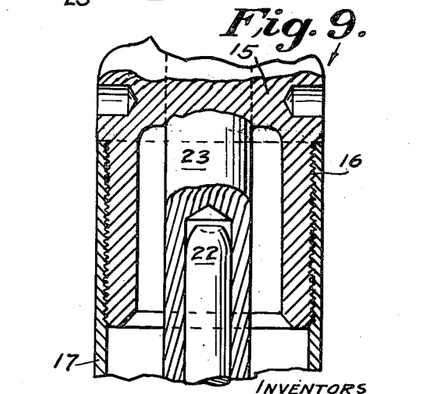
Fig. 9 is an enlarged cross-sectional view of the upper end of the well bore caliper shown in Fig. 1 showing the connection of the caliper to the cable, and is a continuation of Fig. 8.
Figure 11:
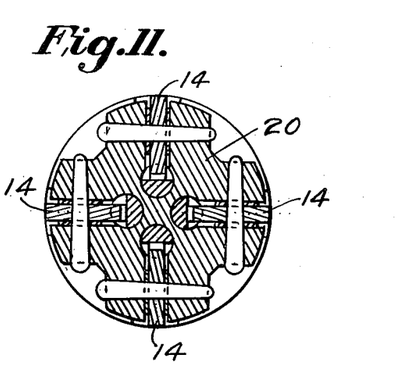
Fig. 11 is a cross-section through the caliper probe taken on the line 11—11 of Fig. 3 and showing the manner in which the measuring arms are attached to the caliper body.
Figure 19:
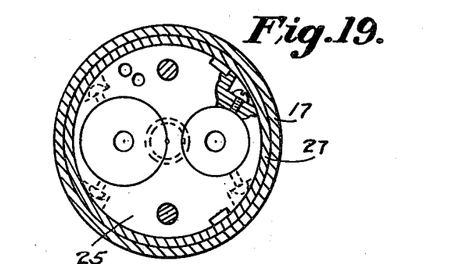
Fig. 19 is a cross-section of the caliper probe taken on the line 19—19 of Fig. 8 showing a base plate member for supporting several of the electrical elements of the probe.
Figure 20:
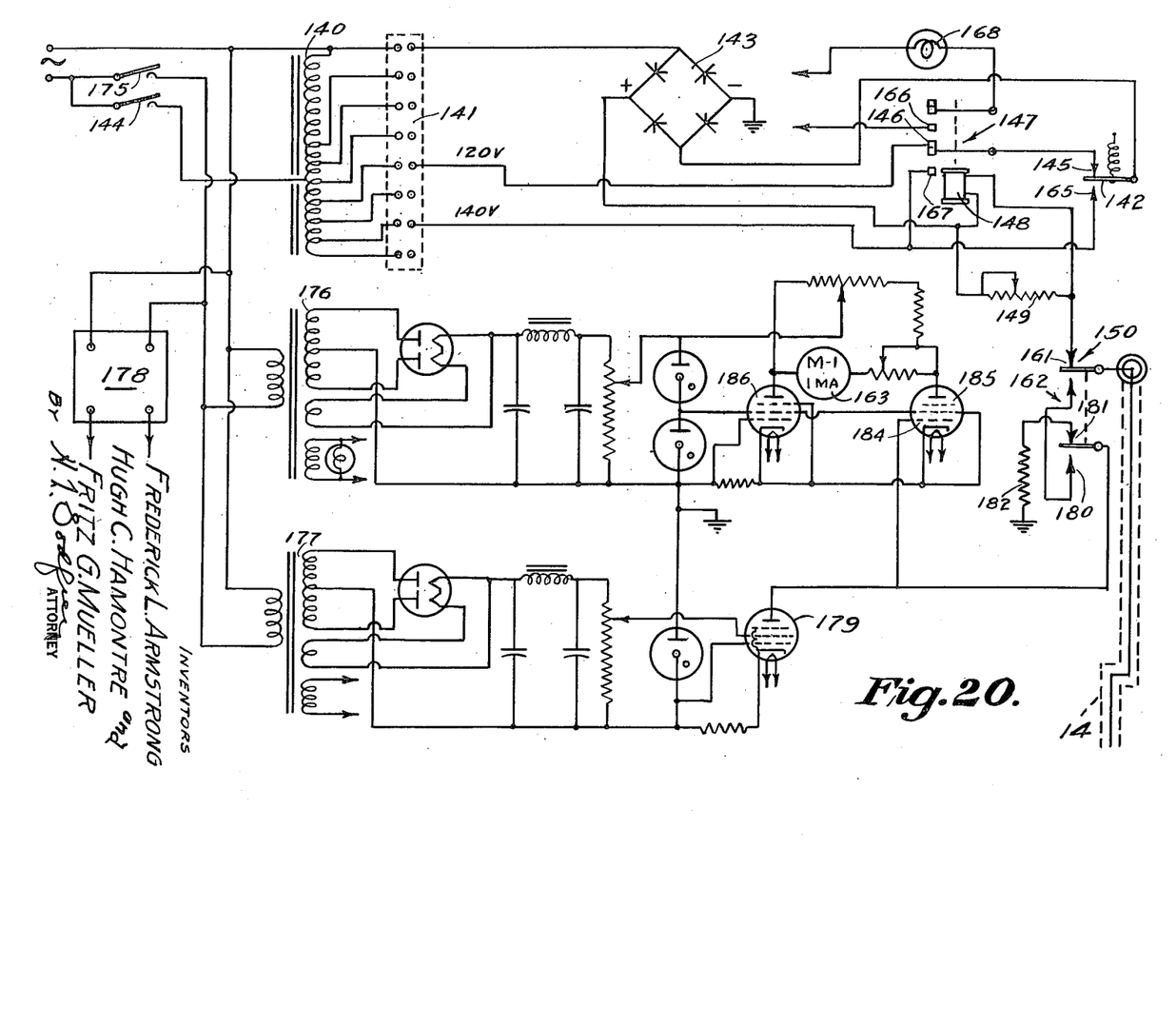
Fig. 20 is a circuit diagram showing a part of the electrical circuit of the apparatus of this invention and including the control and recording system located at the surface of the ground.
Figure 21:
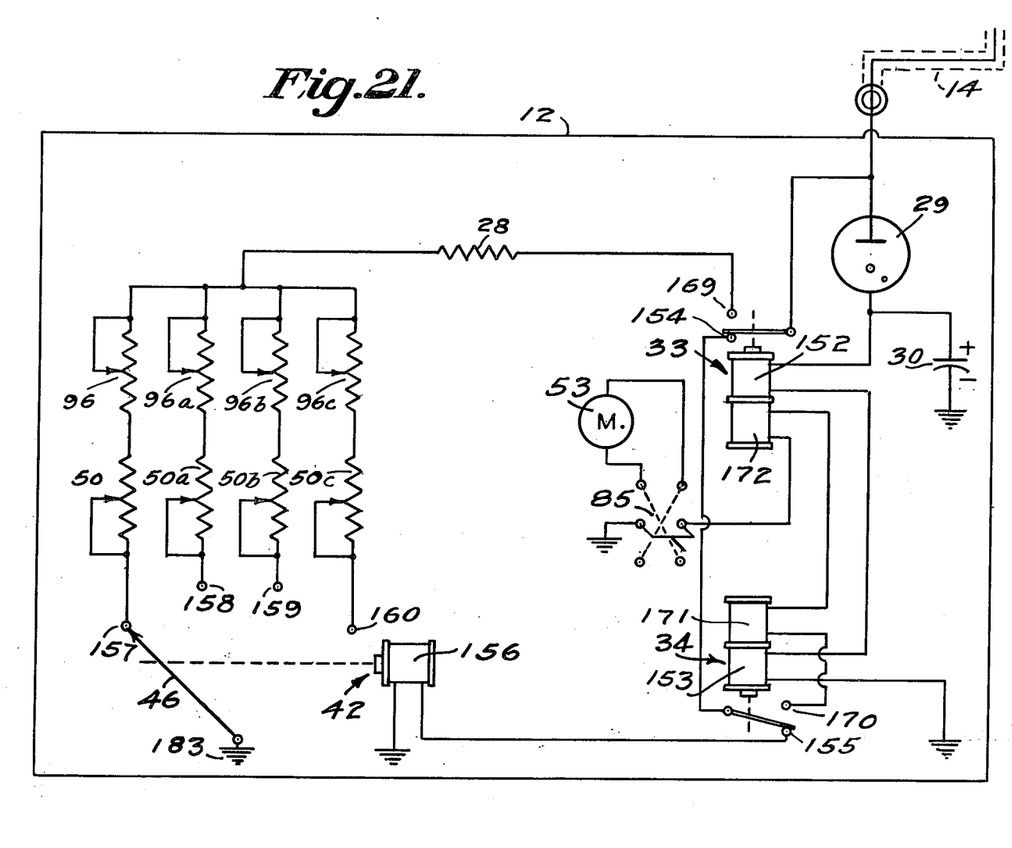
Fig. 21 is a continuation of a circuit diagram of Fig. 20 showing the part of the electrical circuit of this invention located in the caliper probe.

Contact is made between the conductor wire of cable 14 and a contact post 22 in the caliper probe by any suitable means shown in Fig. 9 as a contact plunger 23 in the cable head 15. The contact post 22 is carried by a top plate 24, of Bakelite or other suitable insulating material, which in turn is connected to a base plate 25 by means of support posts 26. A sleeve 27 facilitates the assemblage of this part of the equipment for insertion into the housing 17. The space between the top plate 24 and base plate 25, which may be designated as a relay circuit compartment, contains a resistor 28, an electron tube 29, and a capacitor 30. It will be understood that the support plates are provided with suitable sockets, slots, and holes for wires and electrical connections to complete the circuit as shown in Figs. 20 and 21. Several of these may be seen in Fig. 19. This is also true of the various sleeves, support plates, housings, and the like, hereinafter described in connection with the other elements within the caliper probe unit.

The base plate 25 is coupled, as by means of a stud 31 to a housing member 32 which forms a compartment for relays 33 and 34. These relays are provided with tension adjustment means for the contact arms 36 thereof, including springs 37, attached to adjustable elements 38. Tension on the springs 37 may be adjusted by moving the position of the elements 38 by means of adjusting screws 39. Relays 33 and 34 are double-wound to provide an operating and a holding coil as will be described below.

The housing member 32 for relays 33 and 34 is coupled by means of a connector stud 40 to a housing 41 which houses a stepping relay 42. Lock screws prevent these housing members from becoming disengaged. Energizing of the stepping relay solenoid 42a causes a ratchet switch arm 43 to be pulled downwardly against pressure of spring 44 whereby ratchet dog 45 at the end of the arm causes switch ratchet 46 to rotate. The ratchet switch is designed to turn in sequence to four different positions whereby it completes a circuit to the four measuring resistors in sequence as will be further described below in connection with the circuit diagrams of Figs. 20 and 21.

Figure 18:
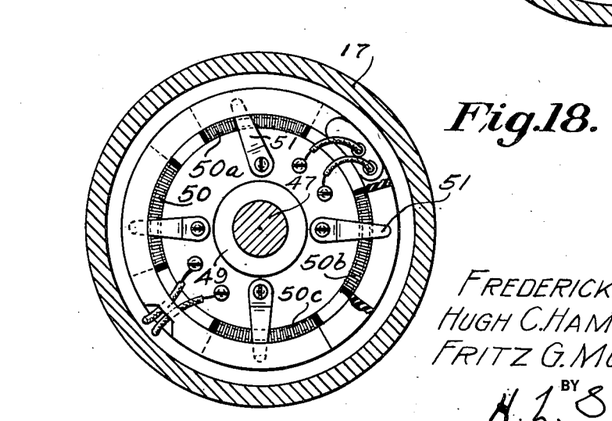
Fig. 18 is a cross-section through the caliper probe taken on the line 18—18 of Fig. 7 and showing calibration resistors.

The stepping relay housing 41 is connected by means of a coupling bolt 47 to a motor housing 48 and is spaced therefrom by a Bakelite spacer element 49 which forms a support for four calibration resistors 50, 50a, 50b, and 50c in the measuring circuit. As shown in Fig. 18, calibration of the individual measuring circuits may be accomplished by adjusting the position of calibration resistance arms 51.

The motor housing 48 in cooperation with motor clamps 52 holds a reversible motor 53 in the probe body. Electrical connections to the motor are made through contact element 54, brushes 55, slip ring 56, and suitable wiring (not shown). A motor drive connector 57 operating in bearing 58 fits into a socket 59 of a flexible coupling 60, which in turn is connected to a speed reducer 61. The speed reducer 61 may be of a conventional type having, for example, a speed reduction ratio of 225 to 1. The drive train is further provided with a suitable fly wheel and governor as shown at 62.

The speed reducer 61 through a coupling member 63 drives a plunger screw 64 which actuates a plunger assembly consisting of a spring compression plunger 65, spring 66, and bottom plunger 67. Drive assembly housings 68, 69, and 70 and plunger assembly housing 71 are held in place by a tube or liner 72 which also facilitates assemblage of the various elements prior to insertion in the probe casing. It will be noted that housing 68 couples the liner 72 to motor housing 48.

Suitable thrust bearings 73 seated in housing 70 and held therein by retainer ring 74 are provided for flange 75 of the plunger screw 64 so that rotation of the motor 53 will feed spring compression plunger 65 down or pull it back depending upon the direction of motor rotation. The plunger assembly is further provided with a spring guide 76 which threadedly engages the bottom plunger at 77 and is free to slide within the bore 78 of spring compression plunger 65. Spring guide sleeve 79 further maintains the spring 66 in alignment. It will be understood that when a resistance to movement is encountered by the bottom plunger 67 which is greater than the force of spring 66, the spring compresses and the spring compression plunger 65 moves downward with respect to the spring guide. Guide sleeve 79 is sufficiently short to permit such movement. A slot 80 in the spring compression plunger 65 in cooperation with a screw 81 in housing 71 holds this element in proper position and limits its travel to the length of the slot.

Spring compression plunger 65 is further provided with lugs 82 and 83 for operating the trip 84 of a double pole double throw toggle switch 85. One contact of the double throw toggle switch is positive and the other is a ground contact. When the toggle switch is in the position shown in Fig. 5, contact is made between two upper contact strips which are wired to the motor in such a way that the motor runs counter-clockwise and forces the plunger assembly down. When the plunger assembly has been forced down until lug 82 contacts trip 84, it throws the toggle switch to its lower position in which it makes contact with two lower contact strips which are wired to the motor in such a way that the polarity of the motor is reversed. When this occurs the motor runs clockwise and the plunger moves up until lug 83 again contacts trip 84 and throws it to its up position. Terminal ring 90 and plate members 91 and 92 secured to the housing 71 hold the switch elements. As aforementioned, the housing elements are provided with suitable holes and slots for the necessary wiring and electrical connections.

The section of the caliper member between the bottom plunger 67 and the plunger block 20 is oil-filled and contains both a hydraluic system for operating the caliper arms 13 and the electrical resistors for determining the position of these arms. Plunger 67 is fitted with an O-ring 93 to provide a pressure-tight seal between the oil filled portion and the upper portion of the caliper. Hydraulic pressure is applied from plunger chamber 67a through an oil duct 94 in coupling block 19 to an oil-filled chamber containing measuring resistors 96, 96a, 96b, and 96c carried by the ends 100 of shafts 101 which operate the measuring arms 13. The ends 100 of the shafts 101 are subjected to the hydraulic pressure and when forced down cause spur gears 102 to rotate about pins 103 to open measuring arms 13. Resistors 96, 96a, 96b, and 96c move down with the respective shafts to vary the amount of resistance in measuring circuit thereby making it possible to determine the position of the measuring arms through the measuring circuit. Springs 104 and guides 105 are provided for each shaft. The springs 104 urge the shafts upwardly whereby the measuring arms are closed when the plunger assembly is retracted. The ends of the springs are seated in bores 106 of a stop 107, the position of which may be axially adjusted by means of stud bolt 109 and nut 110. The stop 107 is adjusted to a position in which axial movement of the shafts 101 and guides 105 is limited to prevent measuring arms 13 from opening through an arc greater than 90°.

Well pressure is sealed from the bores containing shafts 101 by a pressure tight tube 111 secured to plunger block 20 by means of bolts 112. Bottom piece 21 is likewise secured to the plunger block, and is recessed as at 113 to allow measuring arms 13 to close into the recesses to save space and for protection when the instrument is being lowered into or removed from a well. Suitable sealing means such as O-rings 98 are further provided for each of the shafts 101 on each side of the gear elements.

Figure 4:
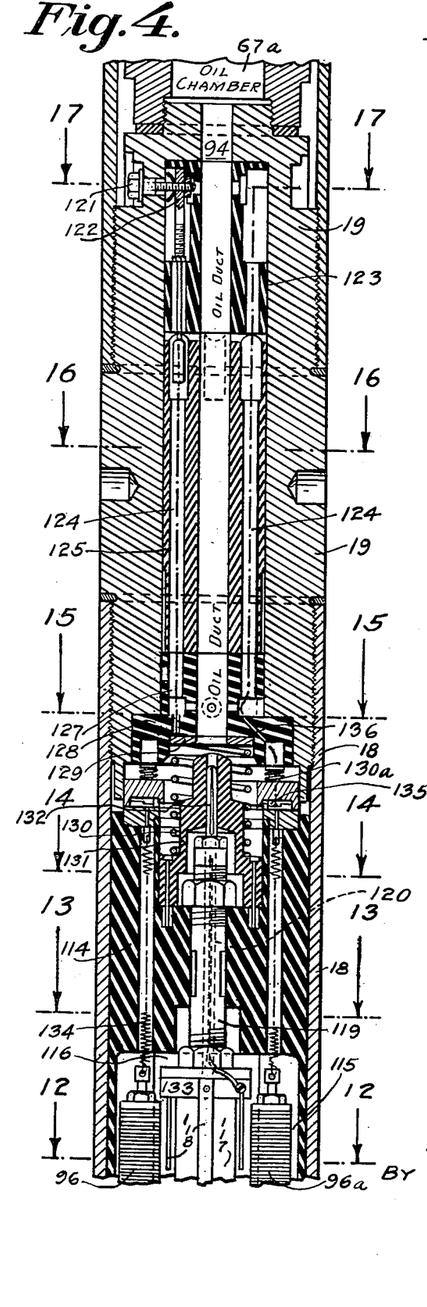
Fig. 4 is an enlarged cross-sectional view of an intermediate portion of the well bore caliper of Fig. 1 and is a continuation of Fig. 3
Figure 5:
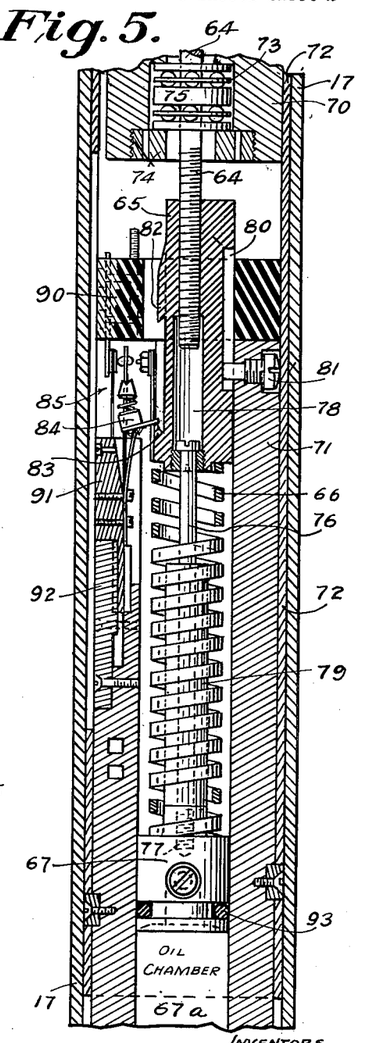
Fig. 5 is an enlarged cross-sectional view of an intermediate portion of the well bore caliper of Fig. 1 and is a continuation of Fig. 4.
Figure 6:
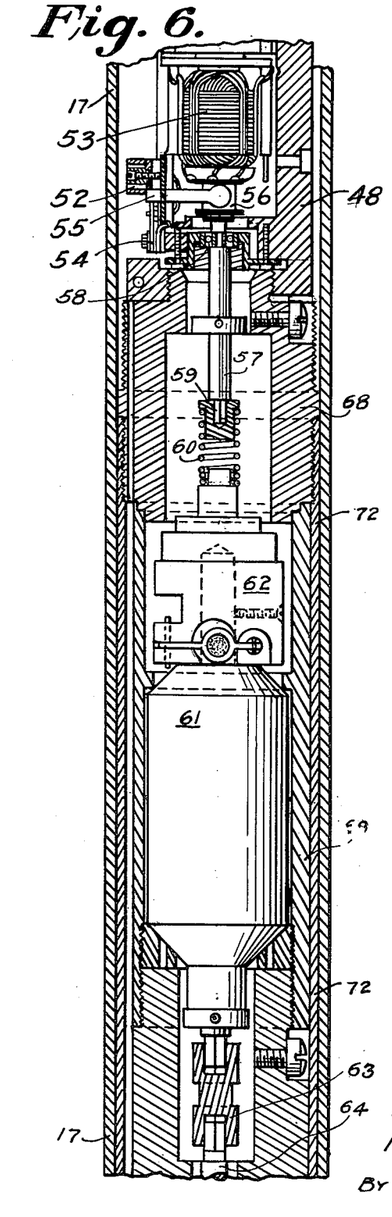
Fig. 6 is an enlarged cross-sectional view of an intermediate portion of the well bore caliper of Fig. 1 and is a continuation of Fig. 5.
Figure 7:
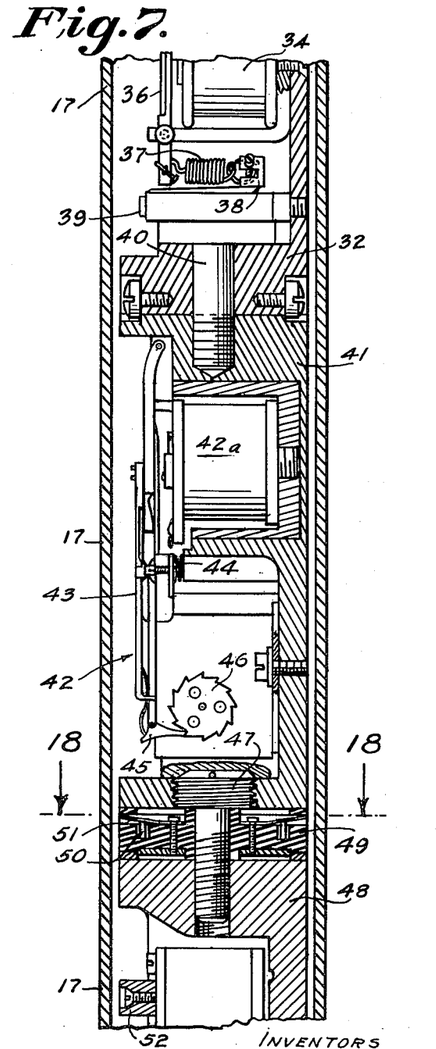
Fig. 7 is an enlarged cross-sectional view of an intermediate portion of the well bore caliper of Fig. 1 and is a continuation of Fig. 6.
Figure 8:
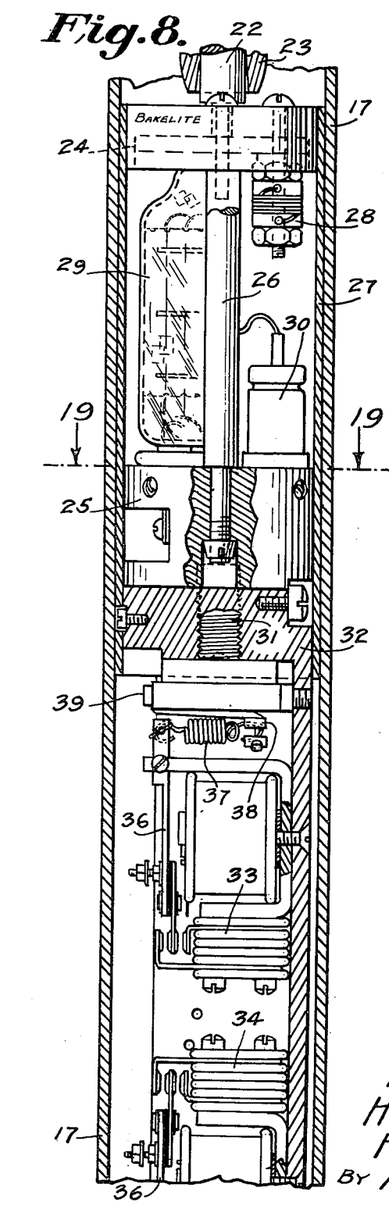
Fig. 8 is an enlarged cross-sectional view of an intermediate portion of the well bore caliper of Fig. 1 and is a continuation of Fig. 7.
Figures 12, 13, 14, 15:
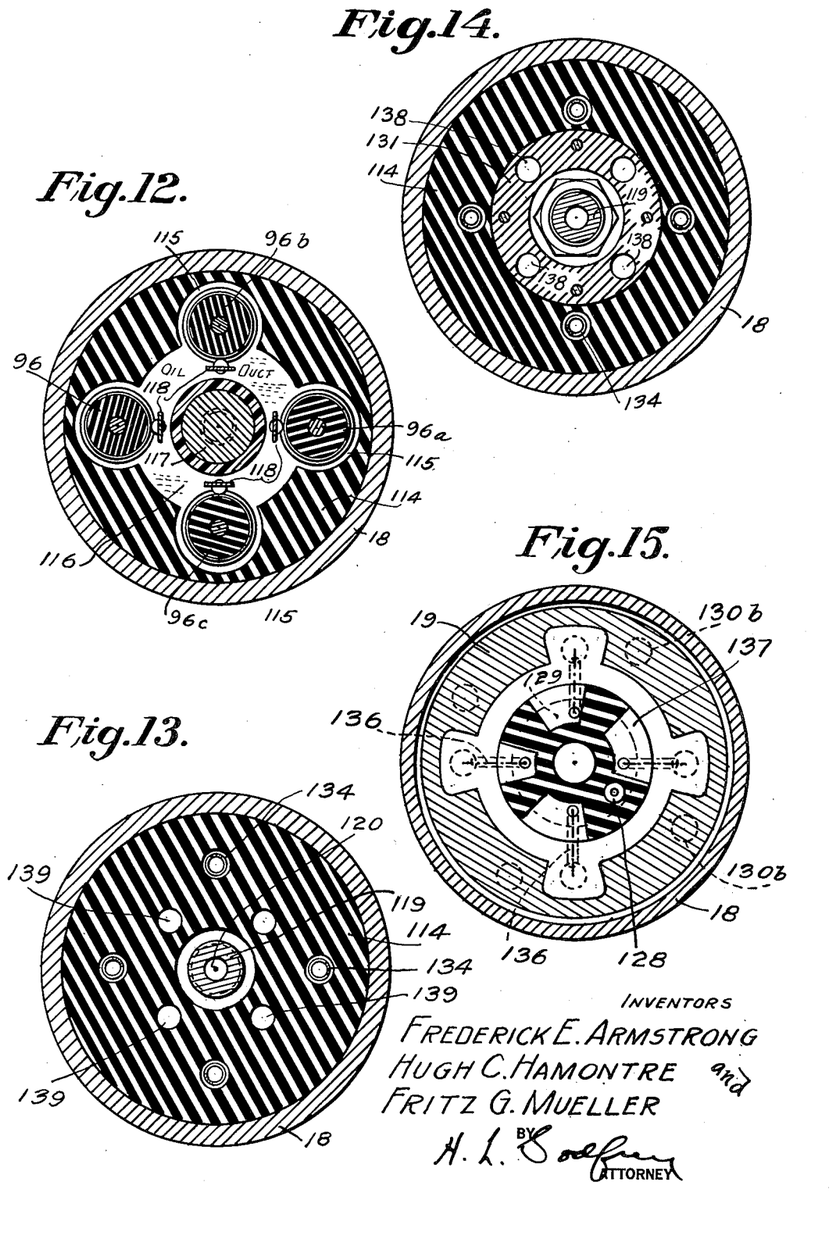
Fig. 12 is a cross-section through the caliper probe taken on the line 12—12 of Fig. 4 and showing part of the measuring resistor housing.
Fig. 13 is a cross-section through the caliper probe taken on the line 13—13 of Fig. 4 and showing passages for oil and electrical connections in the measuring resistor housing.
Fig. 14 is a cross-section through the caliper probe taken on the line 14—14 of Fig. 4 and likewise showing passages through the measuring resistor housing.
Fig. 15 is a cross-section taken on the line 15—15 of Fig. 4.
Figure 16:
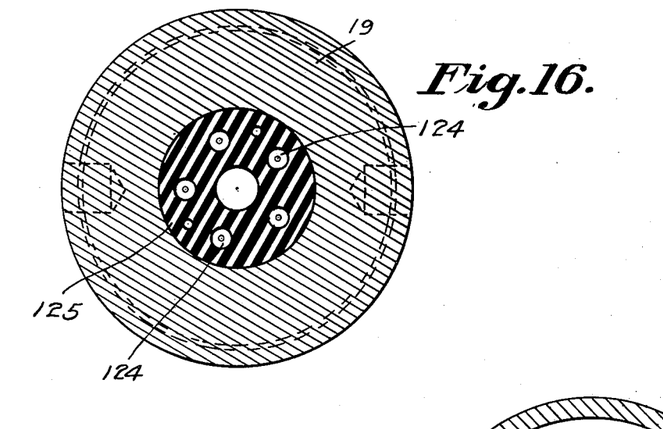
Fig. 16 is a cross-section taken on the line 16—16 of Fig. 4.

The measuring resistors 96, 96a, 96b, and 96c and associated contact elements are held in a suitable housing 114, of Bakelite or other insulating material, the details of which may best be seen in Fig. 4 and in the accompanying cross-sections shown in Figs. 12 through 14. The housing 114 is provided with suitable bores 115 which permit axial movement of the resistors. Slots connect these bores to an enlarged oil-filled interior bore 116 which accommodates a fixed support 117 for spring contact arms 118, whereby the contact arms make sliding contact with the respective resistors. The contact support 117 is held in place by a post 119 which engages housing 114 and which has a hollow stem 120 in the upper portion thereof to accommodate electrical connections.

Figure 17:
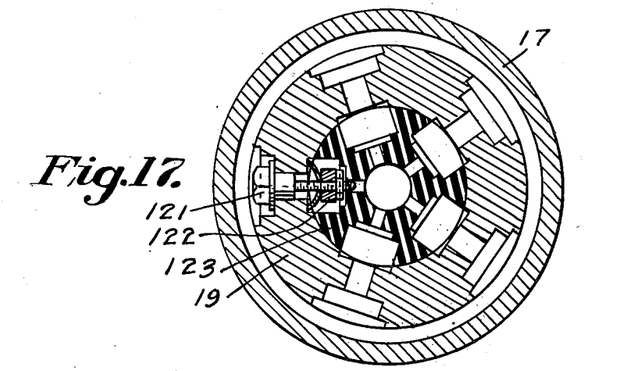
Fig. 17 is a cross-section through the caliper probe taken on the line 17—17 of Fig. 4 and showing the electrical contact means for connecting the measuring resistors of the apparatus to the control and measuring circuits.

The electrical connections for the measuring resistors are made through contact screws 121 and associated contact elements 122 in the contact block 19. The contact screws and elements are five in number and may be spaced as shown in Fig. 17. Only one of the screws is fully shown for the sake of simplicity of illustration. An insulating terminal housing 123 carries the contact screws and associated elements. One of the contact screws is connected by suitable wiring (not shown) to the caliper conductor 14, in a manner that will become apparent from the description in connection with the circuit diagrams of Figs. 20 and 21, and forms a positive contact. From this contact, electrical connection is made by suitable wiring through one of five bores 124 in insulating sleeve 125, following the dot-dash line shown to the left of the oil duct in Fig. 4, through one of registering bores 127 in terminal head 128 to a metal ring 129. From ring 129 contact is made through spring 130, spring guide 131, banana plug 132, and a suitable conductor in the hollow stem of support post 119 to a contact ring 133 which makes contact with the four spring contact arms 118. The circuit is completed through a selected resistor 96, 96a, 96b or 96c, each of which is provided with a spring 134 which acts as a conductor and also permits axial movement of the respective resistor, contact segments 135, suitable wiring illustrated by the dot-dash line to the right of the oil duct of Fig. 4 through a channel 136 in the terminal head 128 and through an associated bore 124 in the insulating sleeve 125 to one of the remaining four contact screws 121. These four screws make connection through suitable wiring to the four calibration resistors 50 previously described, which in turn are connected to stepping relay 42. The stepping relay functions to ground the circuit through the resistors, grounding them one at a time in sequence whereby their resistances can be separately measured.

The spring 130 provides the dual function of maintaining the various electrical contact elements in the resistor housing in proper position and of conducting the electrical current of the measuring circuit. Springs 130a seated in bores 130b in contact block 19 (Fig. 15) serve to maintain tight connections between the electrical contact segments. The terminal head 128 is slotted as shown at 137 in Fig. 15 so as to permit the conductors from the four channels 136 to enter the respective aligned bores to the terminal screws.

In order to permit free passage of oil from the oil duct 94 to the measuring resistor chamber where it may act hydraulically on shafts 101, oil holes 138 are provided in spring guide 131 which register with similar oil holes 139 in the resistor housing 114, as shown in Figs. 14 and 13 respectively.

For a further description of the operation of the apparatus reference is made particularly to the circuit diagram of Figs. 20 and 21. The well-bore caliper in the illustrative embodiment of the invention is designed to operate on a 110-volt, 60-cycle power source. Power for operation of the instrument is supplied through switch 144 to an auto-transformer 140 which provides voltages in 101 volt increments from 90 to 150 volts. The taps on transformer are connected to an 8-terminal Jones barrier strip 141. The 120- and 140-volt terminals on the barrier strip are connected to a double-throw switch 142 so that the position of the switch determines which of the two voltages is applied to a full-wave bridge, selenium rectifier 143. These two rectified voltages selectively control the operation of the caliper probe, the lower voltage being used to operate the stepping relay circuit and the higher voltage operating the motor for extending and retracting the caliper arms.

In operation, the caliper probe 12 with arms 13 retracted is lowered on its cable to the desired section in the well. The 140-volt circuit from transformer 140 is used to operate the motor 53 which opens and closes the measuring arms 13 of the caliper probe. The motor 53 is put into operation by momentarily pressing switch 142 (Fig. 20) which breaks contact 145 and makes contact 165. Current flows through contact 165 of switch 142 to rectifier 143 where it is converted to direct current. The direct current from the rectifier flows through the coil 148 of relay 147, and is sufficient to close this relay thereby making contacts 166 and 167. Contact 166 completes a circuit to a pilot light 168, which indicates when motor 53 is running. Contact 167 completes a circuit from the 140-volt tap on transformer 140 to contact 145 of switch 142. The release of switch 142 makes contact 145, whereupon current then flows from the 140-volt tap on transformer 140 through contact 167 of relay 147 and contact 145 to the rectifier 143. From the rectifier direct current flows through the energizing coil 148 of relay 147 and through contact 161 of switch 150 the arm of which is connected to the single-conductor of armored cable 14. Current flows through the 4000 feet of cable to the caliper probe 12.

In the probe, gas-filled electron tube 29 is ionized and at this voltage conducts approximately 8 milliamperes of current through the coils 152 and 153 of double wound relays 33 and 34 to ground, thereby closing both relays. These relays are adjusted to operate at different current levels through coils 152 and 153 but both operate at the current level of the motor circuit. The current then flows through contact 154 of relay 33 and contact 170 of relay 34 through the second coils 171 and 172 of relays 33 and 34 to motor reversing switch 85. From switch 85 the current flows through motor 53 to ground. After the relays 33 and 34 have both closed and current is flowing through coils 171 and 172 of the two relays, the impedance of coils 171 and 172, the resistance of the 4,000 foot cable, and the impedance of motor 53 reduce the voltage at the probe to approximately 30 volts. This voltage is not sufficient to maintain ionization of tube 29. However, these relays are held in the energized position by current through coils 171 and 172. When motor 53 reaches its limit of travel in one direction of rotation, reversing switch 85 is thrown in the manner previously described, momentarily interrupting the circuit. The interruption of current flow through the coil of relay 147 causes contacts 166 and 167 to open, and pilot light 168 goes out, signaling the operator that the motor has reversed. At this point the caliper measuring arms have been forced open to the fullest extent permitted by the well bore and are in measuring position. When the pilot light 168 goes out, the operator pushes switch 150 and isolates the motor circuit from the probe by breaking contact 161. This operation also closes the measuring circuit so that the measuring resistances may be read. The manner in which these resistances are selectively measured will be described below.

To close the measuring arms after the desired readings have been made, switch 142 is closed and the same series of events occurs to start motor 53 except that reversing switch 85 was thrown at the bottom limit of the motor travel while opening the measuring arms and the polarity of the motor was reversed. The motor runs in reverse until switch 85 is again thrown, and pilot light 168 signals the operator who shuts the motor off with the measuring arms in a closed position.

The mechanical events that occur when motor M is in operation may be explained with reference to Figures 2–6. The drive shaft 57 of motor 53 is connected to the plunger assembly 65, 66 and 67 through flexible coupling 60, 225-to-1 gear reducer 61, and a drive-screw 64. As drive screw 64 rotates, it forces plunger 67 into oil-filled compartments 67a and hydraulic pressure is exerted on the four shafts 101. Spur gears 102 on the measuring arms 13 fit into a section of rack gear 102a machined in shafts 101. As hydraulic pressure is applied to shafts 101, they are forced down, causing spur gears 102 to rotate and open measuring arms 13 out against the wall of the well bore. The pre-loaded spring 66 in the master plunger assembly makes possible independent motion of the measuring arms and allows each measuring arm to follow the contour of the well bore independently. Spring 66 also allows the top section 65 of master plunger assembly to travel its full stroke, regardless of the position of the measuring arms.

Lugs 82 and 83 operate the toggle switch 85 which in turn controls the direction of rotation of motor 53. As motor 53 rotates clockwise, the plunger is forced down until the upper stop contacts toggle switch 85 which switches to its reversing position. At that point the caliper arms are extended and the motor is shut off by the operator by pressing switch 150 at the same time connecting the probe to the meter.

The foregoing sequence of events is required to open the caliper measuring arms to their measuring position and occurs in approximately 30 seconds after contact is made with the 140-volt circuit of the instrument by closing switch 142.

The operation of the measuring circuit will now be described. Power is supplied to the measuring circuit by closing switch 175 (Fig. 20) and energizing transformers 176, 177 and 178. Transformer 176 supplies voltage for the meter circuit of the instrument and transformer 177 supplies power for the probe circuit. Transformer 178 supplies a constant voltage to the tube filaments of the measuring circuit.

The probe-circuit voltage supply is taken from the plate of a constant-current supply-tube 179 and is applied to the measuring resistor of the probe by closing switch 150. As switch 150 is closed, it makes contacts 162 and 180 and breaks contacts 161 and 181. When contact 161 is broken, the power circuit is isolated from the caliper probe, and as contact 181 is disconnected, it removes a calibration resistor 182 from the circuit. A constant current from the plate of tube 179 flows through contacts 162 and 180, the armored cable 14, contact 169 of relay 33, resistors 28, 96, 50, and the contact arm 46 of stepping relay 42 to ground 183. At the voltages of the measuring circuit, the tube 29 does not ionize and the tube acts as an open switch.

It will be noted that the resistance value of the measuring resistor 96 of the well-bore caliper is least when the measuring arm is closed. In the closed position of the measuring arm the plate voltage of tube 179 is minimum. At extended positions of a measuring arm 13, the resistance of associated resistor 96 is greater, and the plate voltage to tube 179 is increased in direct relationship to the radius measured by the measuring arm.

The plate voltage of tube 179 is applied to the grid 184 of tube 185 in the meter circuit, and controls the plate current of this tube. As the measuring arm of the probe opens to more extended positions, the resistance of resistor 96 increases and the plate voltage of tube 179 also increases, making the grid 184 of tube 185 more positive with respect to the cathode and thereby controlling the current flowing through meter 163. Meter 163 is calibrated to read in inches, and as the amount of current flowing is directly related to the position of the measuring arm, the radii of the well can be read directly from the meter.

The manner in which the positions of each of the measuring arms may be selectively read from meter 163 will now be described.

Power from the 120-volt terminal of the terminal strip operates stepping relay 42 (Fig. 21) in the caliper probe which switches contact arm 46 from one measuring-arm resistor 96 to another and makes possible individual measurements of the position of the measuring arms 13. Current flows through the 120-volt tap on transformer 140, through contact 145 of switch 142, a contact 146 of a relay 147 to the full-wave bridge rectifier 143, and is converted to direct current. From the rectifier the direct current flows through the energizing coil 148 of relay 147 and through a shunt resistor 149 to meter switch 150, then through the single-conductor of armored cable 14 to the caliper probe. The resistance of shunt resistor 149 is adjusted so that the coil 148 of the relay 147 does not have enough current passing through it to close the relay during this operation, but closes during operation of the motor circuit.

In the caliper probe 12, gas-filled electron tube 29 ionizes and conducts approximately 3 milliamperes of current through the coils 152 and 153 of the two relays 33 and 34 to ground. Relay 33 is closed (as shown) and current flows through contacts 154 of relay 33 and 155 of relay 34 to the energizing coil 156 of switching relay 42. The relay 34 is so adjusted that the current through coil 153 is insufficient to cause it to close during this operation in contrast to the previous operation of the motor circuit during which the higher current caused the relay to close. Relay 42 operates the contact arm 46 which changes contact from position 157 to position 158, isolating measuring resistor 96 and its associated calibration resistor 50 from the circuit and grounding measuring resistor 96a through calibration resistor 50a. To change the contact arm 46 to the next measuring resistor 96b, switch 150 in the surface equipment is pushed, breaking contact 161 and making contact 162 to the measuring equipment and de-energizing the circuit through the tube 29, relay coils 152 and 153, and the coil 156 of relay 42. As the relay coil 156 de-energizes, the contact arm 46 is set to switch to the next contact 159 and the switch is completed by releasing switch 150, causing the foregoing cycle to repeat. Thus, the position of each caliper arm may be measured independently of the others by pushing switch 150 four times, and by reading meter 163 in the measuring circuit each time.

As will be apparent from the above description, the device of this invention incorporates many novel and advantageous features. One of these is the use of the gas-discharge type vacuum tube 29, as the isolating element of the measuring circuit. This type of tube has the characteristic of conducting only after the voltage applied to it has reached a certain level. With the particular tube used in the embodiment described, this level is about 80 volts. Since the voltage in the measuring circuit never exceeds 15 volts, the tube does not ionize, and acts as an open circuit during the measuring operation. This feature, together with the voltage-current relays 33 and 34, forms the basis of design which allows single conductor operation.

The voltage-current relays 33 and 34 may be constructed as modifications of standard 2,500-ohm relays. The energizing coils of these relays may be re-wound and, in addition to the 2,500-ohm winding, a second winding of much heavier wire added. The second winding is designed to hold the relays closed when a current of 1 ampere or greater flows through them. The use of a holding coil which is substantially independent of applied voltage is necessary, because of the relatively large voltage drop that takes place in the armored cable when sufficient current is flowing to operate motor 53.

The mechanical linkage between the measuring resistors and the measuring arms of any well-bore caliper is of such nature that the relationship between the angular position of the measuring arms and the position of the measuring resistor is a tangential function of the radius of the well bore, causing the radius reading to appear on the meter scale in a nonlinear manner. The nonlinear meter scale reduces the rapidity with which the meter readings can be made and increases the chance of error in meter readings. This undesirable feature has been overcome in the caliper of this invention. A constant measuring current, as supplied by the circuit including tube 179, causes the applied voltage across the measuring resistor to vary linearly with changes in the resistance value of the measuring resistor, instead of exponentially as it would if the customary constant voltage source was used. Linearity of the measuring voltage allows the use of variable-mu tubes 185 and 186 as computing elements to convert the change in resistance that occurs tangentially with respect to the well-bore radius, to a change in current that occurs linearly with respect to the well-bore radius.

By using a constant-current source for the measuring circuit, it is possible to maintain a constant degree of polarization within the circuit, and thus eliminate the error that occurs in all well-bore calipers which now use a constant-voltage source for the measuring circuit. Accordingly, a very accurate reading may be made with the device of this invention.

Further advantages of the invention reside in the fact that it can be constructed of a diameter of less than two inches so that it will pass through the 2-inch tubing commonly used at the top of a producing zone. The ease with which the arms may be extended or retracted by merely pressing a control button in the surface equipment facilitates operation under many conditions. Retraction of the arms permits recovery of the instrument from a well section having a restricted opening. Moreover, the arms may be retracted when a check run of a section of a well is desired, there being no necessity of returning the instrument to the surface for resetting the arms. The hydraulic control for opening and closing the caliper arms and the means permitting independent movement of these arms further contributes to the accuracy, speed, and ease of operation of the device.

It will be appreciated from a reading of the foregoing specification that the invention herein described is susceptible of various changes and modifications without departing from the spirit and scope thereof.

What is claimed is:

1. A well bore caliper comprising electrical indicating and control means adapted to be located at the surface of the ground near the mouth of a bore-hole, an elongated body member having a plurality of measuring arms adapted to be lowered into said bore-hole, a conductor cable connecting said body member to said surface equipment, means in said body member for selectivity extending and retracting said measuring arms in response to electrical signals from said surface equipment through said conductor cable, a variable resistor in said body member for each of said measuring arms and responsive to the position thereof, and means for selectivity connecting each of said variable resistors to said surface indicating means through said cable whereby the position of each of said measuring arms may be determined.

2. A well bore caliper comprising an elongated body member adapted to be attached to an electrical cable and to be lowered into a bore hole, a plurality of measuring arms pivotally attached to said body member and adapted to swing outwardly therefrom, a reversible motor in said body member, means responsive to rotation of said motor in one direction to extend said measuring arms to the limits permissible by said well bore, means for retracting said measuring arms upon rotation of said motor in an opposite direction, means for controlling said motor, and means for measuring the position of said measuring arms.

3. A well bore caliper comprising an elongated body member having a plurality of measuring arms pivotally attached thereto and adapted to swing outwardly from said body member into contact with the walls of a borehole, gear segments attached to each of said measuring arms, shafts having teeth meshing with said gear segments and adapted to operate said arms, spring means urging said shafts in a direction whereby said arms are normally in a retracted position, hydraulic means operable to drive said shafts against said spring means in a direction extending said arms, a reversible motor for operating said hydraulic means, means for limiting the hydraulic pressure applied whereby the arms may stop independently upon engaging the walls of the well bore while the motor continues to rotate, means for reversing said motor after a predetermined length of travel, and means for determining the position of said measuring arms.

4. A well bore caliper comprising an elongated body member having a plurality of measuring arms recessed therein and pivotally attached thereto, said arms being adapted to swing outwardly from said body member into contact with the walls of a bore hole, gear segments attached to each of said measuring arms, shafts having teeth meshing with said gear segments adapted to operate said arms, spring means urging said shafts in a direction whereby said arms are normally in a retracted position, hydraulic means operable to drive said shafts against said spring means in a direction extending said arms, a reversible motor for operating said hydraulic means, means for limiting the hydraulic pressure applied whereby the arms may stop independently upon engaging the walls of the well bore while the motor continues to rotate, means for reversing said motor after a predetermined length of travel, and electrical means responsive to the position of said shafts for determining the position of each of said measuring arms.

5. A well bore caliper comprising an elongated body member adapted to be attached to a conductor cable and lowered into a borehole, a plurality of measuring arms pivotally attached to said body member and recessed therein, said arms being adapted to swing outwardly from said body member to contact the walls of a bore-hole, gear segments attached to each of said measuring arms, shafts having teeth meshing with said gear segments adapted to operate said arms, spring means urging said shafts in a direction whereby said arms are normally in a retracted position, hydraulic means operable to drive said shaft against said spring means in a direction of extending said arms, a reversible motor for operating said hydraulic means, means for limiting the hydraulic pressure applied whereby the arms may stop independently upon engaging the walls of the well bore while the motor continues to rotate, means for reversing said motor after a predetermined length of travel whereby the hydraulic pressure on said shafts is released thereby permitting the measuring arms to return to said retracted position, a variable resistor mounted in said body member for each of said arms, means to vary said resistors in response to movement of the respective arms, and means for selectively connecting each of said resistors to said conductor cable.

6. A well bore caliper comprising an elongated body member having a plurality of measuring arms pivotally attached thereto and adapted to swing outwardly from said body member into contact with the walls of a bore-hole, gear segments attached to each of said measuring arms, shafts having teeth meshing with said gear segments adapted to operate said arms, spring means urging said shafts in a direction whereby said arms are normally in a retracted position, said body member having a hydraulic chamber accommodating the ends of said shafts, plunger means operable upon said hydraulic chamber to drive said shafts by hydraulic pressure against said spring means in a direction extending said arms, a reversible motor for operating said plunger means, resilient means connecting said motor and said plunger whereby a predetermined hydraulic pressure may be applied, means for reversing said motor after a predetermined length of travel whereby the hydraulic pressure may be released and said arms may return to their normal position, and means connected to said shafts and responsive to the movement thereof to indicate the position of the measuring arms.

7. A well bore caliper comprising an elongated body member having a plurality of measuring arms pivotally attached thereto and adapted to swing outwardly from said body member into contact with the walls of a well bore, gear segments attached to each of said measuring arms, shafts having teeth meshing with said gear segments adapted to operate said arms, spring means urging said shafts in a direction whereby said arms are normally in a retracted position, said body member having a hydraulic chamber accommodating the ends of said shafts, a cylinder and piston assembly operable upon said chamber for applying hydraulic pressure upon said shafts, said piston assembly comprising a bottom member resiliently connected to a top member, a reversible motor adapted to drive said top member, switch means response to a predetermined travel of said top member to reverse said motor, and means responsive to the position of said shafts for determining the position of said measuring arms.

8. A well bore caliper comprising electrical apparatus adapted to be located at the surface of the ground near the mouth of a borehole, an elongated body member having a plurality of measuring arms adapted to be lowered into said bore-hole, a conductor cable connecting said body member to said surface equipment, said measuring arms being pivotally attached to said body member and adapted to swing outwardly therefrom into contact with walls of the bore-hole, hydraulic means for extending and retracting said arms, a reversible motor for operating said hydraulic means, switch means in said body member for reversing the direction of rotation of said motor after a predetermined length of travel of said hydraulic means, signal means in said ground equipment responsive to reversal of said motor, means for starting and stopping said motor, a plurality of variable resistors in said body member responsive to the position of said measuring arms, and means for selectively connecting each of said variable resistors to indicating means in said surface equipment whereby the position of each of said measuring arms may be determined.

9. A well bore caliper comprising electrical equipment adapted to be located at the surface of the ground near the mouth of a bore-hole, an elongated body member having a plurality of measuring arms attached thereto adapted to be lowered into said bore-hole, a conductor cable connecting said body member to said surface equipment, a reversible motor in said body member for extending and retracting said measuring arms, a variable resistor in said body for each of said measuring arms responsive to the position thereof, a stepping relay in said body member for selectively connecting each of said variable resistors to a measuring circuit in said surface equipment, means in said surface equipment to selectively supply a plurality of voltages through said electrical conductor to said body member, means in said body member responsive to one selected voltage to connect said reversible motor through said cable to a power source and responsive to another selected voltage to operate said stepping relay.

10. A well bore caliper comprising electrical apparatus including a measuring circuit, a control circuit, and means for supplying electrical power at different voltages to said control circuit, adapted to be located at the surface of the ground near the mouth of a bore-hole, an elongated body member having a plurality of measuring arms adapted to be lowered into said borehole, a single conductor cable connecting said body member to said surface equipment, switch means in said surface equipment for selectively connecting said control circuit and said measuring circuit to the single conductor, a reversible motor in said body member, hydraulic means in said body member responsive to the direction of rotation of said reversible motor to selectively extend and retract said measuring arms, means in said body to reverse the direction or rotation of said motor at predetermined limits of travel of said hydraulic means, a variable resistor in said body for each of said measuring arms, the resistance thereof being responsive to the position of said arms, a stepping relay in said body member for selectively connecting each of said resistors to said measuring circuit, means in said body member responsive to a selective control voltage to complete a circuit to said reversible motor through said single conductor, and responsive to a different selected voltage to operate said stepping relay.

11. In an electrical caliper comprising a body member having a plurality of measuring arms swingable outwardly therefrom and a variable resistor for each arm, means for independently varying each resistor in response to movement of its measuring arm, a conductor connecting said body member to a measuring circuit, means for selectively connecting each of said resistors in turn from said conductor to ground, and means in said measuring circuit for supplying a constant current to said resistors through said conductor and for measuring the voltage of said resistor circuit whereby the position of each of said measuring arms may be determined.

12. In a well-bore caliper comprising a body member having a plurality of measuring arms swingable outwardly therefrom to contact the sides of a bore-hole and having a variable resistor for each measuring arm, means for extending and retracting said arms, means for independently varying each resistor in response to movement of its measuring arm, a conductor connecting said body member to a measuring circuit, means for selectively connecting each of said resistors in turn from said conductor to ground, means in said measuring circuit for supplying a constant current to said resistors through said conductor, and means in said measuring circuit responsive to the voltage in said resistor circuit to indicate the direct linear distance of each of said measuring arms from said body member.

13. A well-bore caliper comprising electrical apparatus adapted to be located at the surface of the ground near the mouth of a bore-hole, said apparatus including a measuring circuit, a motor circuit, and a relay circuit, an elongated body member having a plurality of measuring arms adapted to be lowered into said borehole, a single conductor connecting said body member to said surface apparatus, a reversible motor in said body member for selectively extending and retracting said measuring arms and responsive to electrical signals from said electrical apparatus, a variable resistor in said body member for each of said measuring arms, the resistance thereof being responsive to the position of said arms, relay means for selectively connecting each of said variable resistors through said conductor cable to said measuring circuit, said measuring circuit including electrical means for converting the tangential relation of said arms with respect to said body member into a direct linear relationship whereby a direct measurement of radii of the well bore may be obtained.

14. In an electrical caliper comprising a body member having a plurality of measuring arms and a plurality of resistors the resistance of each of which is variable as a function of the position of an associated measuring arm, a single conductor for connecting said body member with surface equipment including a measuring and power circuit, a reversible motor for extending and retracting said arms, a stepping relay for selectively completing a circuit through each of said resistors to said measuring circuit, and means responsive to a plurality of predetermined voltages through said single conductor to selectively complete circuits from said conductor to said reversible motor, from said conductor to said stepping relay, and from said conductor to said resistors, whereby said measuring arms may be extended to measuring position and the position of each may be independently determined.

15. A well bore caliper comprising an elongated body member having a plurality of measuring arms, a reversible motor in said body, means connecting said reversible motor and said arms whereby said arms may be selectively extended and retracted upon operation of said motor, a variable resistor in said body for each arm, means for varying the resistance of each of said resistors in response to the movement of its respective arm, a conductor connecting said body member to surface equipment including a measuring circuit and a power circuit adapted to supply a plurality of selected voltages, switch means in said surface equipment for selectively connecting said measuring circuit and said power circuit to said conductor, circuit means in said body for connecting said resistors in parallel to said conductor, a stepping relay in said body for connecting the other side of each of said resistors in turn to ground, circuit means in said body for connecting said stepping relay from said conductor to ground, circuit means in said body connecting said reversible motor from said conductor to ground, and means in said body responsive to a predetermined voltage through said conductor to selectively connect said resistor circuit, stepping relay circuit, and motor circuit to said conductor.

16. A well bore caliper comprising an elongated body member having a plurality of measuring arms, a variable resistor for each of said arms the resistance of which is responsive to the movement of said arm, a reversible motor in said body, means resiliently connecting said arms to said motor whereby said arms may be extended by rotation of said motor in one direction to the limits permitted by the walls of said well bore and said arms may be retracted upon reversal of said motor, switch means for reversing said motor after a predetermined length of travel, a single conductor connecting said body to surface equipment including a measuring circuit and power circuit adapted to supply a plurality of different voltages, a stepping relay for selectively completing a circuit through each of said variable resistors from said single conductor to ground, circuit means connecting said stepping relay from said single conductor to ground circuit means connecting said reversible motor from said single conductor through said reversible motor from said single conductor through said reversing switch to ground, and means responsive to predetermined selected voltages through said conductor to selectively connect each of said circuits to said conductor, whereby the arms of said body may be extended and the position thereof independently measured and said arms may then be retracted.

References Cited in the file of this patent

UNITED STATES PATENTS

| | | |
|---|---|---|
| 2,150,070 | Kregecz | Mar. 7, 1939 |
| 2,324,865 | Milligan | July 20, 1943 |
| 2,417,062 | Coake | Mar. 11, 1947 |
| 2,637,842 | Smith | May 5, 1953 |
| 2,640,271 | Boucher | June 2, 1953 |
| 2,656,613 | Goble | Oct. 27, 1953 |
| 2,660,800 | Wiley | Dec. 1, 1953 |